(12) United States Patent
Maeda

(10) Patent No.: US 9,359,515 B2
(45) Date of Patent: Jun. 7, 2016

(54) WATER-BASED INK FOR INK-JET RECORDING, INK CARTRIDGE, AND INK-JET RECORDING APPARATUS

(71) Applicant: Mitsunori Maeda, Nagoya (JP)

(72) Inventor: Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 89 days.

(21) Appl. No.: 14/228,394

(22) Filed: Mar. 28, 2014

(65) Prior Publication Data

US 2014/0292903 A1 Oct. 2, 2014

(30) Foreign Application Priority Data

Mar. 29, 2013 (JP) ................................ 2013-073969
Mar. 29, 2013 (JP) ................................ 2013-074463

(51) Int. Cl.
*C09D 11/30* (2014.01)
*C09D 11/38* (2014.01)
*C09D 11/322* (2014.01)

(52) U.S. Cl.
CPC .............. *C09D 11/38* (2013.01); *C09D 11/322* (2013.01)

(58) Field of Classification Search
CPC ....... C09D 11/30; C09D 11/322; C09D 11/38
USPC ...................................................... 106/31.68
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 6,569,231 B1 | 5/2003 | Mathias et al. | |
| 6,988,795 B2 | 1/2006 | Doi | |
| 7,922,805 B2 | 4/2011 | Kowalski et al. | |
| 8,016,404 B2 | 9/2011 | Kato et al. | |
| 8,222,318 B2 * | 7/2012 | Mizushima et al. | 523/160 |
| 8,333,451 B2 * | 12/2012 | Baldy et al. | 347/11 |
| 8,574,357 B2 | 11/2013 | Kagata et al. | |
| 2003/0065294 A1 * | 4/2003 | Pickup | A01K 11/005 604/304 |
| 2004/0114013 A1 | 6/2004 | Doi | |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2010/0256284 A1 | 10/2010 | Kagata et al. | |
| 2013/0068130 A1 | 3/2013 | Kagata et al. | |

FOREIGN PATENT DOCUMENTS

| | | |
|---|---|---|
| JP | H08-3498 A | 1/1996 |
| JP | 2000-513396 A | 10/2000 |
| JP | 2001-152072 A | 6/2001 |
| JP | 2004189870 A | 7/2004 |
| JP | 2007145925 A | 6/2007 |
| JP | 2008-524400 A | 7/2008 |
| JP | 2008-246821 A | 10/2008 |
| JP | 2009-515007 A | 4/2009 |
| JP | 2011-132483 A | 7/2011 |
| JP | 2012-111867 A | 6/2012 |

\* cited by examiner

*Primary Examiner* — Bruce H Hess
(74) *Attorney, Agent, or Firm* — Banner & Witcoff, Ltd.

(57) ABSTRACT

There is provided a water-based ink for ink-jet recording, including: a pigment; water; and alkyl glucoside which has alkyl group having 6 or more carbon atoms.

19 Claims, 1 Drawing Sheet

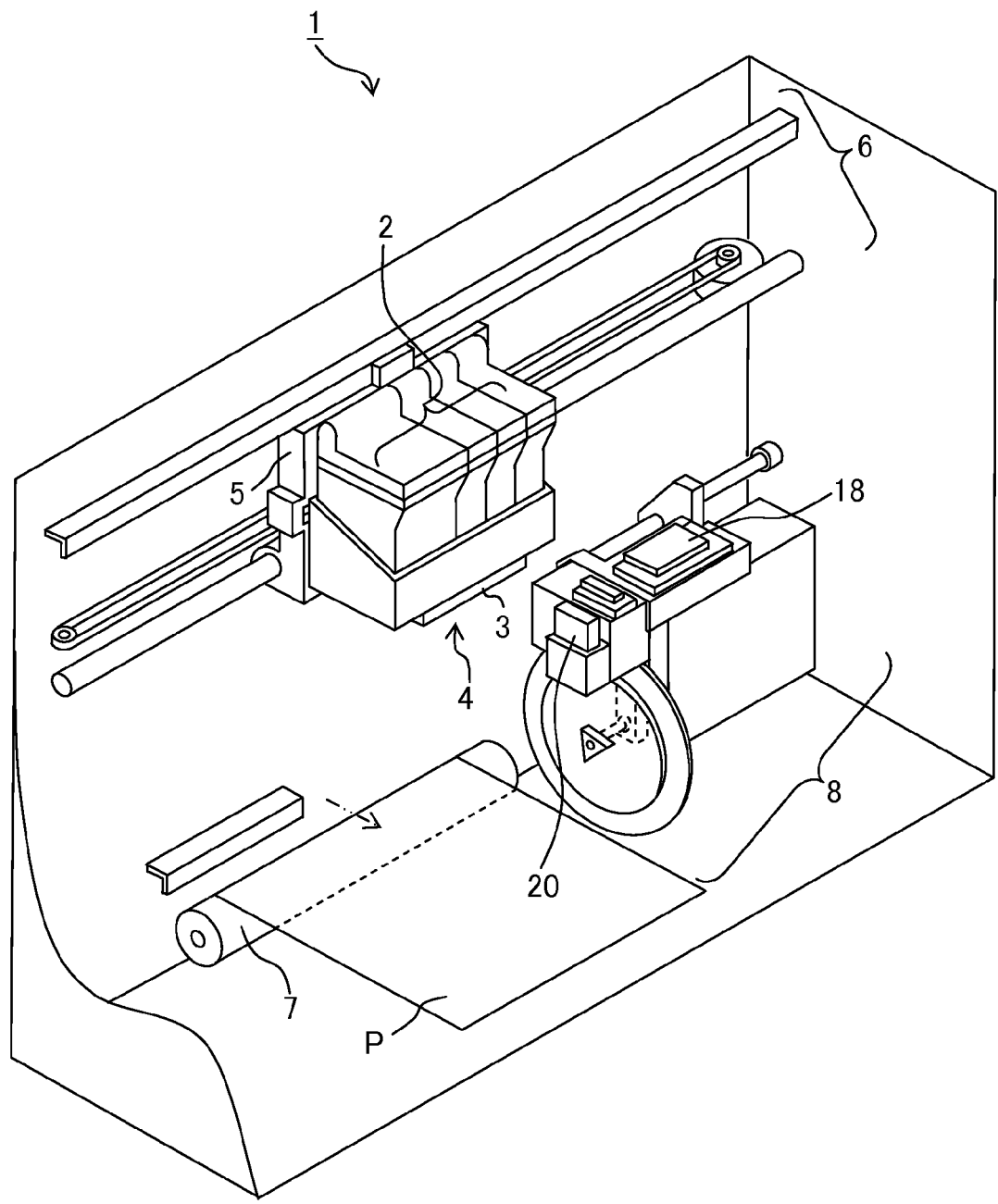

WATER-BASED INK FOR INK-JET RECORDING, INK CARTRIDGE, AND INK-JET RECORDING APPARATUS

CROSS REFERENCE TO RELATED APPLICATION

The present application claims priority from Japanese Patent Application No. 2013-073969 filed on Mar. 29, 2013 and Japanese Patent Application No. 2013-074463 filed on Mar. 29, 2013, the disclosures of which are incorporated herein by reference in its entirety.

BACKGROUND OF THE INVENTION

1. Field of the Invention

The present invention relates to a water-based ink for ink jet recording, an ink cartridge, and an ink jet recording apparatus.

2. Description of the Related Art

There has been suggested addition of a surfactant in order to improve the re-dispersion property of a water-based ink for ink jet recording using a pigment (hereinafter sometimes referred to as "water-based pigment ink") (Japanese Patent Application Laid-open No. 2001-152072 corresponding to U.S. Pat. No. 6,569,231).

In addition to the excellent re-dispersion property, the water-based pigment ink is required to have a satisfactory vaporization property, and is required not to cause white-striped or white-streaked unevenness (banding) in a recorded image. However, it is difficult to improve all of the properties of the water-based pigment ink.

In view of the above, an object of the present teaching is to provide a water-based ink for ink-jet recording using a pigment which has an excellent re-dispersion property, has a satisfactory vaporization property, and is capable of obtaining an recorded image in which white-striped or white-striped unevenness (banding) is suppressed.

Further, the water-based ink for ink jet recording using the pigment is required to improve an optical density (OD value). In order to achieve this, various suggestions have been made (for example, Japanese Patent Application Laid-open No. 2004-189870 corresponding to United States Patent Application Publication No. 2004/0114013 and Japanese Patent Application Laid-open No. 2007-145925). The water-based ink for ink jet recording using the pigment is required to have not only a high optical density (OD value) but also the excellent re-dispersion property.

In view of the above, another object of the present teaching is to provide a water-based ink for inkjet recording using a pigment which has a high optical density (OD value) and an excellent re-dispersion property.

SUMMARY OF THE INVENTION

According to a first aspect of the present teaching, there is provided a water-based ink for ink jet recording including: a pigment; water; and alkyl glucoside which has alkyl group having 6 or more carbon atoms.

According to a second aspect of the present teaching, there is provided a water-based ink for ink-jet recording including: a pigment; water; alkyl glucoside which has alkyl group having 6 or more carbon atoms; and 1,2-alkanediol having 4 to 6 carbon atoms.

According to a third aspect of the present teaching, there is provided an ink cartridge containing the water-based ink for ink jet recording as defined in the first aspect or the second aspect.

According to a fourth aspect of the present teaching, there is provided an ink jet recording apparatus including: the water-based ink for ink jet recording as defined in the first aspect or the second aspect; an ink accommodating section in which the water-based ink is accommodated; and an ink discharge mechanism which is configured to discharge the water-based ink accommodated in the ink accommodating section.

BRIEF DESCRIPTION OF THE DRAWINGS

FIG. 1 is a schematic perspective view of an exemplary construction of an ink jet recording apparatus of the present teaching.

DESCRIPTION OF THE PREFERRED EMBODIMENTS

The re-dispersion property of a water-based ink for inkjet recording (hereinafter referred to as "water-based ink" or "ink" in some cases) in the present teaching means, for example, solubility and dispersion property of a solid matter, in a water-based ink, generated after the water-based ink is once evaporated to dryness with resultant solid matter, the solubility and dispersion property being those of when the solid matter is then newly brought in contact with the water-based ink. The re-dispersion property of the water-based ink can be measured, for example, by a method explained in Examples which will be described later.

First Embodiment

An explanation will be given about a water-based ink of the first embodiment of the present teaching. The water-based ink of the first embodiment includes a pigment, water, and alkyl glucoside which has alkyl group having 6 or more carbon atoms.

In the first embodiment, the pigment is not limited, and includes, for example, carbon black, an inorganic pigment, and an organic pigment. The carbon black includes, for example, furnace black, lamp black, acetylene black, and channel black. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Any other pigment is also usable provided that the pigment is dispersible in a water phase (aqueous phase). Specific examples of the pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like. The water-based ink of the first embodiment may be a preparation obtained by dispersing the pigment in water using a dispersing agent. As the dispersing agent, for example, a general polymer dispersant may be used. Further, the pigment may be polymetrically encapsulated in the water-based ink of the first embodiment.

The pigment may be a self-dispersible pigment. The self-dispersible pigment is dispersible in water without using any dispersing agent, for example, owing to the fact that at least one of the hydrophilic functional group and the salt thereof including carbonyl group, hydroxyl group, carboxylic acid group, sulfonic acid group (sulfonate group), phosphoric acid group (phosphate group), etc., is introduced into the pigment particles by the chemical bond directly or via any other group. It is possible to use self-dispersible pigments subjected to the surface treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. 2006/0201380, and Published Japanese Translation of PCT International Publication for Patent Application No. 2009-515007 corresponding to United States Patent Application Publication No. 2007/0100023 and United States Patent Application Publication No. 2007/0100024. It is possible to use, as a material for the self-dispersible pigment, either one of the inorganic pigment and the organic pigment. Further, a pigment which is suitable for the above-described treatment includes, for example, carbon black such as "MA8" and "MA100" produced by Mitsubishi Chemical Corporation. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Corporation; "BONJET (trade name) BLACK CW-2" and "BONJET (trade name) BLACK CW-3" produced by Orient Chemical Industries, Ltd.; "LIOJET (trade name) WD BLACK 002C" produced by TOYO INK SC HOLDINGS CO., LTD.; and the like.

The solid content blending amount of the pigment (pigment solid content) with respect to the entire amount of the water-based ink is not particularly limited, and may be appropriately determined based on desired optical density or color (hue, tint), etc. The pigment solid content is, for example, 0.1% by weight to 20% by weight, is preferably 1% by weight to 15% by weight, and is more preferably 2% by weight to 10% by weight.

The water-based ink may include a colorant other than the pigment. The colorant other than the pigment is exemplified by a dye and the like. The water-based ink may not include any colorant other than the pigment. The white-striped unevenness (banding) is more likely to occur in a recorded image when the pigment is used as the colorant. Therefore, the present teaching is effective for a water-based ink which substantially includes only the pigment as the colorant, for example, a water-based ink in which the pigment is contained as the colorant in an amount of 90% by weight to 100% by weight.

It is preferable that the water is ion exchange water or pure water (purified water). The blending amount of water (water ratio) with respect to the total amount of the water-based ink is, for example, 10% by weight to 90% by weight, and preferably 40% by weight to 80% by weight. The water ratio may be, for example, the balance of the other components.

As described above, the water-based ink includes alkyl glucoside which has alkyl group having 6 or more carbon atoms (hereinafter referred to as "alkyl glucoside" in some cases). By blending the alkyl glucoside which has the alkyl group having 6 or more carbon atoms with a water-based pigment ink, it is possible to obtain a water-based ink having an excellent re-dispersion property and a satisfactory vaporization property, and thereby making it possible to obtain a recorded image in which the white-striped unevenness (banding) is suppressed. The mechanism in which the alkyl glucoside is blended to make the vaporization property good is assumed, for example, as follows. That is, a pyranose ring (glucoside group) of the alkyl glucoside has four hydroxyl groups and has an extremely high hydrophilic property. Thus, the alkyl glucoside functions as a humectant and has the vaporization property superior to other surfactants. This mechanism is just an assumption and the present teaching is not limited and restricted by this assumption. The alkyl glucoside is a compound represented by the following general formula (1):

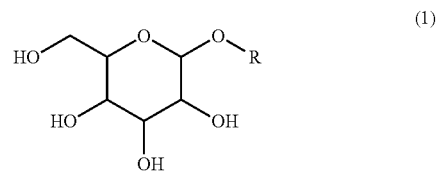

in the general formula (1), "R" is alkyl group having 6 or more carbon atoms and the alkyl group may have either straight chain or branched chain.

In the general formula (1), the mechanisms in which the alkyl group has 6 or more carbon atoms to suppress the white-striped unevenness (banding) and to make the re-dispersion property good are assumed, for example, as follows. That is, regarding the suppression of the white-striped unevenness (banding), the alkyl glucoside is a surfactant, which is composed of the pyranose ring as hydrophilic group and the alkyl group as hydrophobic group. In a case that the alkyl group has a low number of carbon atoms (alkyl chain is short), surface action function is weak and the water-based ink is less likely to spread on a recording medium such as a recording paper. As a result, some solid portions are not filled with the ink and thereby causing white stripes. Since the alkyl group has 6 or more carbon atoms in this embodiment, the white-striped unevenness (banding) is suppressed in this embodiment. Regarding the re-dispersion property, the alkyl glucoside may exist in a state that the hydrophobic group thereof (alkyl group) faces the surface of the pigment and the hydrophilic group thereof faces outside, in a case that the water-based ink is evaporated. Then, when the alkyl glucoside is newly brought in contact with water, the hydrophilic group is solvated with water. Thus, water exists at a position close to the surface of the pigment as compared with a case in which no alkyl glucoside is added, and thereby improving the re-dispersion property. However, in the case that the alkyl group of the alkyl glucoside has a low number of carbon atoms (alkyl chain is short), no alkyl glucoside may exist in the vicinity of the surface of the hydrophobic pigment. Therefore, it is difficult to improve the re-dispersion property. Since the alkyl group has 6 or more carbon atoms in this embodiment, the re-dispersion property is satisfactorily improved in this embodiment. The above mechanisms are just assumptions and the present teaching is not limited and restricted by these assumptions. In the general formula (1), the alkyl group preferably has 8 to 12 carbon atoms. The alkyl glucoside which has the alkyl group having 12 or less carbon atoms dissolves well in water. The alkyl glucoside is exemplified, for example, by n-hexyl-β-D-glucoside, 2-ethylhexyl-β-D-glucoside, n-octyl-β-D-glucoside, n-decyl-β-D-glucoside, and n-dodecyl-β-D-glucoside.

The blending amount of the alkyl glucoside (ratio of the alkyl glucoside) with respect to the entire amount of the water-based ink is not particularly limited, and may be appropriately determined by considering the number of carbon atoms of the alkyl group. In a case that the alkyl group has 8 to 12 carbon atoms, the ratio of the alkyl glucoside is preferably 0.7% by weight to 5% by weight. In a case that the alkyl group has 8 carbon atoms, the ratio of the alkyl glucoside is preferably 0.7% by weight to 7% by weight. In a case that the alkyl group has 10 carbon atoms, the ratio of the alkyl glucoside is preferably 0.5% by weight to 5% by weight. In a case that the alkyl group has 12 carbon atoms, the ratio of the alkyl glucoside is preferably 0.2% by weight to 5% by weight. Accordingly, as the alkyl group of the alkyl glucoside has more carbon atoms, the ratio of the alkyl glucoside in the water-based ink is preferably smaller. The surface-active function of the alkyl glucoside is stronger as the alkyl group has more carbon atoms. Thus, it is assumed that the white-striped unevenness (banding) in the recorded image can be suppressed even by a lower blending amount of the alkyl glucoside, and thereby making it possible to improve the re-dispersion property.

The water-based ink may further contain a water-soluble organic solvent provided that the effect of the present teaching can be exhibited. The water-soluble organic solvent is exemplified, for example, by a humectant which prevents the water-based ink from being dried at a tip or forward end portion of a nozzle of an ink jet head and a penetrant which adjusts the drying speed on the recording medium.

The humectant described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyether such as polyalkylene glycol; polyhydric alcohols such as alkylene glycol, glycerol, and trimethylolpropane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type (kind) of the humectant as described above may be used singly, or two or more types (kinds) of the humectants as described above may be used in combination. Among them, it is preferable to use polyhydric alcohol such as alkylene glycol and glycerol.

The blending amount of the humectant with respect to the total amount of the water-based ink is, for example, 0% by weight to 95% by weight, preferably 5% by weight to 80% by weight, and more preferably 5% by weight to 50% by weight.

The penetrant includes, for example, glycol ether. The glycol ether includes, for example, ethylene glycol methyl ether, ethylene glycol ethyl ether, ethylene glycol n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. One type (kind) of the penetrant as described above may be used singly, or two or more types (kinds) of the penetrants as described above may be used in combination.

The blending amount of the penetrant with respect to the total amount of the water-based ink is, for example, 0% by weight to 20% by weight, preferably 0.1% by weight to 15% by weight, and more preferably 0.5% by weight to 10% by weight.

The water-based ink may further contain conventionally known additives, if necessary. The additive includes, for example, surfactants other than the alkyl glucoside which has the alkyl group having 6 or more carbon atoms (those exhibiting the effect of the present teaching only), pH-adjusting agents, viscosity-adjusting agents, surface tension-adjusting agents, and fungicides. The viscosity-adjusting agent is exemplified, for example, by polyvinyl alcohol, cellulose, and water-soluble resin.

The water-based ink may not include any surfactant other than the alkyl glucoside. The water-based ink may substantially include only the alkyl glucoside as the surfactant. The ratio of the alkyl glucoside with respect to the total amount of the surfactant included in the water-based ink is preferably 50% by weight to 100% by weight, and more preferably 90% by weight to 100% by weight.

The water-based ink can be prepared, for example, such that the pigment, water, the alkyl glucoside which has the alkyl group having 6 or more carbon atoms, and optionally other additive component(s) as necessary are mixed uniformly in accordance with any conventionally known method, and undissolved matters are removed by a filter or the like.

As described above, in the first embodiment, by blending the alkyl glucoside which has the alkyl group having 6 or more carbon atoms with the water-based pigment ink, it is possible to obtain the water-based ink having the excellent re-dispersion property and the satisfactory vaporization property, and thereby making it possible to obtain a recorded matter in which the white-striped unevenness (banding) is suppressed.

Second Embodiment

An explanation will be given about a water-based ink of the second embodiment of the present teaching. The water-based ink of the second embodiment includes a pigment, water, 1,2-alkanediol having 4 to 6 carbon atoms (hereinafter referred to as "alkanediol" in some cases), and alkyl glucoside which has alkyl group having 6 or more carbon atoms (hereinafter referred to as "alkyl glucoside" in some cases).

In the second embodiment, the pigment and water are not limited, and it is possible to use the pigment and water which are the same as those in the first embodiment. Further, the solid content blending amount of the pigment (pigment solid content) with respect to the entire amount of the water-based ink and the blending amount of water (water ratio) with respect to the total amount of the water-based ink may be made in the same manner as the first embodiment.

As described above, the water-based ink includes the 1,2-alkanediol having 4 to 6 carbon atoms and the alkyl glucoside which has the alkyl group having 6 or more carbon atoms. The inventors of the present teaching have found that an optical density (OD value) can be improved by adding a large quantity of alkanediol in a water-based pigment ink. The mechanism for improving the optical density is assumed as follows. That is, the 1,2-alkanediol having 4 to 6 carbon atoms has a hydrophobic property higher than that of any other polyhydric alcohol such as glycerol, and thus this moderate hydrophobic property makes the pigment in the water-based ink easier to remain on the paper surface. Further, the alkanediol has a function of improving wettability of the water-based ink to a recording medium. For example, in a case that the recording medium is a paper sheet, the water-based ink including the alkanediol dyes paper fiber sufficiently and unevenness of density in a recorded matter is suppressed. As described above, the alkanediol makes the pigment easier to remain on the paper surface and the unevenness of density in the recorded matter is suppressed. Thus, the optical density (OD value) in the recorded matter is improved. This mechanism is just an assumption and the present teaching is not limited and restricted by this assumption.

However, in a case that a required or necessary amount of alkanediol is added to the water-based pigment ink to improve the optical density (OD value), the re-dispersion property is deteriorated. In view of this, the inventors of the present teaching have found out that it is possible to obtain the water-based ink for ink jet recording having the good optical density (OD value) and the excellent re-dispersion property by further adding the alkyl glucoside to the water-based pigment ink to which the alkanediol has been added.

The alkanediol may be either straight-chain alkanediol or branched-chain alkanediol. The straight-chain alkanediol is more preferable because the straight-chain alkanediol is highly effective for improving the OD value. The straight-chain alkanediol includes 1,2-butanediol (1,2-BD), 1,2-pentanediol (1,2-PeDL), and 1,2-hexanediol (1,2-HDL). The alkanediol preferably has 6 carbon atoms. One type (kind) of the alkanediol as described above may be used singly, or two or more types (kinds) of the alkanediols as described above may be used in combination.

The blending amount of the alkanediol (ratio of the alkanediol) with respect to the entire amount of the water-based ink is, for example, not less than 5% by weight, more preferably not less than 15% by weight. An upper limit of the alkanediol ratio is not particularly limited, and is, for example, not more than 50% by weight, and preferably not more than 40% by weight. In order to prevent the jetting stability from deteriorating due to increase in the viscosity, the upper limit of the alkanediol ratio is more preferably not more than 30% by weight.

The alkyl glucoside is the compound represented by the general formula (1) described above, and it is possible to use the alkyl glucoside which is the same as that of the first embodiment.

It is assumed that the mechanism, in which the alkyl group has 6 or more carbon atoms to make the re-dispersion property good in the general formula (1), is the same as the mechanism described in the first embodiment. Since the alkyl glucoside has the effects to improve the vaporization property of the water-based ink and to suppress the white-striped unevenness (banding) in the recorded matter as described in the first embodiment, it is assumed that the water-based ink in the second embodiment also has the excellent vaporization property and the effect to suppress the white-striped unevenness (banding) in the recorded matter, similar to the water-based ink in the first embodiment.

The blending amount of the alkyl glucoside (ratio of the alkyl glucoside) with respect to the entire amount of the water-based ink is, for example, not less than 0.2% by weight, preferably not less than 0.7% by weight. An upper limit of the alkyl glucoside ratio is not particularly limited, and is, for example, not more than 20% by weight, and preferably not more than 15% by weight. In order to prevent the jetting stability from deteriorating due to increase in the viscosity, the upper limit of the alkyl glucoside ratio is more preferably not more than 10% by weight.

In the second embodiment, it is particularly preferable that the alkanediol has 6 carbon atoms, that the ratio of the alkanediol is not less than 15% by weight, and that the ratio of the alkyl glucoside is not less than 0.7% by weight. Accordingly, it is possible to obtain the water-based ink for ink jet recording having the especially good optical density (OD value) and the especially excellent re-dispersion property.

In the second embodiment, a weight ratio (X:Y) of the alkyl glucoside (X) to the 1,2-alkanediol (Y) in the water-based ink is preferably in a range of (X:Y)=1:1.5 to 1:40, more preferably in a range of (X:Y)=1:15 to 1:21. By making the weight ratio (X:Y) of the alkyl glucoside (X) to the 1,2-alkanediol (Y) within the above range, it is possible to obtain the water-based ink for inkjet recording having a much better optical density (OD value) and a much superior re-dispersion property.

The water-based ink may further contain a water-soluble organic solvent other than the 1,2-alkanediol having 4 to 6 carbon atoms provided that the effect of the present teaching can be exhibited. The water-soluble organic solvent includes, for example, a humectant which prevents the water-based ink from being dried at a tip or forward end portion of a nozzle of an ink jet head and a penetrant which adjusts the drying speed on the recording medium. The humectant and the penetrant are not particularly limited, and it is possible to use the humectant and the penetrant which are the same as those in the first embodiment. The blending amount of the humectant with respect to the entire amount of the water-based ink and the blending amount of the penetrant with respect to the entire amount of the water-based ink may be made in the same manner as the first embodiment. Similar to the first embodiment, the water-based ink in the second embodiment may further contain conventionally known additives, if necessary.

It is preferable that the water-based ink further contains glycerol. The total blending amount of the 1,2-alkanediol and the glycerol in the water-based ink is preferably 15% by weight to 35% by weight, and more preferably 20% by weight to 30% by weight. By making the total blending amount of the 1,2-alkanediol and the glycerol within the above range, it is possible to obtain the water-based ink for ink-jet recording having a much superior re-dispersion property.

The water-based ink can be prepared, for example, such that the pigment, water, the alkanediol, the alkyl glucoside, and optionally other additive component(s) as necessary are mixed uniformly in accordance with any conventionally known method, and undissolved matters are removed by a filter or the like.

As described above, in the second embodiment, by adding the alkyl glucoside which has the alkyl group having 6 or more carbon atoms to the water-based pigment ink to which the 1,2-alkanediol having 4 to 6 carbon atoms has been added, it is possible to obtain the water-based ink for inkjet recording having the good optical density (OD value) and the excellent re-dispersion property. Further, it is assumed that the water-based ink in the second embodiment also has the satisfactory vaporization property and the effect to suppress the white-striped unevenness (banding) in the recorded matter, similar to the water-based ink in the first embodiment.

Third Embodiment

Next, an explanation will be given about an ink cartridge as the third embodiment of the present teaching. The ink cartridge of the third embodiment is an ink cartridge containing a water-based ink for ink-jet recording, wherein the water-based ink is the water-based ink for ink-jet recording of the first embodiment or the water-based ink for ink-jet recording of the second embodiment. For example, any conventionally known main body (body) of an ink cartridge can be used for the main body of the ink cartridge of the present teaching.

Fourth Embodiment

Next, an explanation will be made about an ink-jet recording apparatus and an ink-jet recording method as the fourth embodiment of the present teaching.

The ink-jet recording apparatus of the fourth embodiment is an ink-jet recording apparatus including an ink accommodating section and an ink discharging mechanism which discharges an ink accommodated in the ink accommodating section, wherein the water-based ink for ink-jet recording of the first embodiment or the water-based ink for ink-jet recording of the second embodiment is accommodated in the ink accommodating section.

The ink-jet recording method of the fourth embodiment is an ink-jet recording method for performing recording by discharging a water-based ink on a recording medium in an ink-jet system, wherein the water-based ink for ink-jet recording of the first embodiment or the water-based ink for ink-jet recording of the second embodiment is used as the water-based ink.

The ink-jet recording method of the fourth embodiment can be performed by using, for example, the ink-jet recording apparatus of the fourth embodiment. The recording includes printing of letters (text), printing of images, printing, etc.

FIG. 1 shows an exemplary construction of the ink-jet recording apparatus of the fourth embodiment. As shown in FIG. 1, an ink jet recording apparatus 1 includes, as main constitutive elements, four ink cartridges 2, an ink discharging mechanism (ink jethead) 3, a head unit 4, a carriage 5, a driving unit 6, a platen roller 7, and a purge unit 8.

Each of the four ink cartridges 2 includes one of four color water-based inks of yellow, magenta, cyan, and black one by one. For example, at least one water-based ink, of the four color water-based inks, is the water-based ink for ink jet recording of the first embodiment or the water-based ink for ink jet recording of the second embodiment. The ink jet head 3, which is installed on the head unit 4, performs recording on a recording medium P (for example, recording paper sheet). The four ink cartridges 2 and the head unit 4 are carried on the carriage 5. The driving unit 6 reciprocatively moves the carriage 5 in a linear direction. For example, a conventionally known driving unit can be used as the driving unit 6 (see, for example, Japanese Patent Application Laid-open No. 2008-246821 corresponding to United States Patent Application Publication No. US 2008/0241398). The platen roller 7 extends in the reciprocating direction of the carriage 5, and the platen roller 7 is arranged to face or to be opposite to the ink jet head 3.

The purge unit 8 sucks any defective ink containing bubbles or the like remaining at the inside of the ink jet head 3. For example, a conventionally known purge unit can be used as the purge unit 8 (see, for example, Japanese Patent Application Laid-open No. 2008-246821 corresponding to United States Patent Application Publication No. US 2008/0241398).

A wiper member 20 is arranged adjacently to the purge unit 8 at a portion of the purge unit 8 on a side of the platen roller 7. The wiper member 20 is formed to have a spatula-shaped form. The wiper member 20 wipes a nozzle-formed surface of the ink jet head 3 in accordance with the movement of the carriage 5. With reference to FIG. 1, a cap 18 covers a plurality of nozzles of the ink-jet head 3, which is returned to the reset position when the recording is completed, in order to prevent the water-based inks from being dried.

In the ink-jet recording apparatus 1 of this embodiment, the four ink cartridges 2 are carried on one carriage 5 together with the head unit 4. However, this embodiment is not limited to this. In the ink-jet recording apparatus described above, the respective four ink cartridges 2 may be carried on any carriage distinctly from the head unit 4. Alternatively, the respective four ink cartridges 2 may be arranged and fixed in the ink jet recording apparatus without being carried on the carriage 5. In the modes as described above, for example, the respective four ink cartridges 2 are connected to the head unit 4 carried on the carriage 5 by tubes or the like, and each of the water-based inks is supplied from one of the four ink cartridges 2 to the head unit 4.

The ink jet recording, which uses the ink jet recording apparatus 1, is carried out, for example, as follows. At first, the recording paper sheet P is supplied from a paper-feeding cassette (not shown) provided in the ink-jet recording apparatus 1 on a side portion or lower portion thereof. The recording paper sheet P is introduced between the ink-jet head 3 and the platen roller 7. A predetermined recording is performed on the introduced recording paper sheet P with the water-based ink(s) discharged from the ink-jet head 3. As for the water-based ink of the first embodiment, the re-dispersion property is good and fluidity is maintained even when the water-based ink of the first embodiment is heated and evaporated by the ink-jet head 3. Thus, it is possible to discharge the water-based ink of the first embodiment from the ink-jet head 3 stably. The water-based ink of the second embodiment also has the excellent re-dispersion property and the satisfactory vaporization property, and thus it is possible to discharge the water-based ink of the second embodiment from the ink-jet head 3 stably. The recording paper sheet P for which the recording has been performed is discharged from the ink-jet recording apparatus 1. The white-striped unevenness (banding) is suppressed in a recorded matter recorded by using the water-based ink of the first embodiment. The white-striped unevenness (banding) is suppressed and the optical density (OD value) is good in a recorded matter recorded by using the water-based ink of the second embodiment. In FIG. 1, illustrations of the paper-feeding mechanism and paper-discharging mechanism for the recording paper sheet P are omitted.

The apparatus shown in FIG. 1 adopts the serial type ink-jet head. However, this embodiment is not limited to this. The ink-jet recording apparatus may be an apparatus which adopts a line type ink-jet head.

EXAMPLES

Next, Examples and Comparative Examples of the present teaching will be explained. Note that the present teaching is not limited to and is not restricted by Examples and Comparative Examples which will be described below.

Examples 1-1 to 4-8 and Comparative Examples 1-1 to 4-2

Components except for a self-dispersible pigment, which were included in the Water-based Ink Composition (Tables 1 to 8), were mixed uniformly or homogeneously; and thus an ink solvent was obtained. Subsequently, the ink solvent was added to each of the self-dispersible pigment water dispersions, followed by being mixed uniformly. After that, the obtained mixtures were each filtrated through a cellulose acetate membrane filter (pore size 3.00 μm) produced by Toyo Roshi Kaisha, Ltd., and thus the water-based inks for ink jet recording of Examples 1-1 to 4-8 and Comparative Examples 1-1 to 4-2 were obtained.

With respect to the water-based inks of Examples 1-1 to 4-8 and Comparative Examples 1-1 to 4-2, (a) evaluation of re-dispersion property, (b) evaluation of vaporization property, (c) evaluation of white-striped unevenness (banding), and (d) overall evaluation were performed by the following methods.

(a) Evaluation of Re-Dispersion Property

The water-based inks of Examples and Comparative Examples were dripped each in an amount of 10 μL onto glass slides, respectively. Subsequently, the glass slides were stored overnight under an environment of temperature: 60° C. and relative humidity: 40%, and thus the water-based inks were evaporated and dried. Next, pure water was dripped, in an amount of 1 mL, onto each of the solid matters obtained after the storage. The evaluation samples prepared in such a manner were observed visually, and the re-dispersion property was evaluated in accordance with the following evaluation criteria.

<Evaluation Criteria for Evaluation of Re-Dispersion Property>

A: After dripping of the pure water, the solid matter was completely re-dispersed (dissolved and dispersed in the pure water).

B: A slight amount of the solid matter which was not re-dispersed was confirmed.

C: The solid matter was not re-dispersed (the solid matter which was not re-dispersed clearly was observed).

(b) Evaluation of Vaporization Property 5 g of each of the water-based inks in Examples and Comparative Examples was poured into an open vial (opening size (diameter): 20.2 mm). The open vial was stored overnight in a thermostatic chamber at a temperature of 60 degrees Celsius and a relative humidity of 40%. Then, the state of each of the water-based inks in the open vial after the storage was observed visually, and the vaporization property was evaluated in accordance with the following evaluation criteria.

<Evaluation Criteria for Evaluation of Vaporization Property>

A: Neither foreign matter (aggregation or precipitate of pigment etc.) nor separation was confirmed.

C: Foreign matter (aggregation or precipitate of pigment etc.) and separation were confirmed.

(b) Evaluation of White-Striped Unevenness (Banding)

An ink jet printer-equipped digital multifunction machine DCP-525JN produced by Brother Industries, Ltd., was used to record a solid-color image by each of the water-based inks in Examples and Comparative Examples. Each solid-color image obtained as described above was observed visually, and the white-striped unevenness (banding) was evaluated in accordance with the following evaluation criteria. Regarding the evaluations in Examples and Comparative Examples by use of the water-based yellow ink (Examples 3-1 to 3-27 and Comparative Examples 3-1 to 3-10), blue light is emitted to illuminate each solid-color image for ease of the confirmation of presence or absence of the white-striped unevenness (banding).

<Evaluation Criteria for Evaluation of White-Striped Unevenness (Banding)>

A: No white-striped unevenness (banding) was confirmed in the solid-color image.

B: White-striped unevenness (banding) was slightly confirmed in the solid-color image.

C: White-striped unevenness (banding) was confirmed in the solid-color image.

(d) Overall Evaluation

With respect to each of the water-based inks, the overall evaluation was performed in accordance with the following evaluation criteria based on the results of (a) to (c) described above.

<Evaluation Criteria for Overall Evaluation>

G: All of the evaluation results of (a) to (c) were evaluated as "B" or above.

NG: There was "C" in any of the evaluation results of (a) to (c).

The water-based ink compositions and the evaluation results of the water-based inks of Examples 1-1 to 4-8 and Comparative Examples 1-1 to 4-2 are shown in Table 1 to Table 8.

Tables 1-8 (Following) Legend

*1: Self-dispersible magenta pigment, manufactured by Cabot Specialty Chemicals, number in parenthesis indicates pigment solid content amount

*2: Acethylene diol ethylene oxide (10 mol) adduct, produced by Nissin Chemical Industry Co., Ltd.

*3: Nonionic surfactant, produced by Kao Corporation, number in parenthesis indicates an active-ingredient amount

*4: Sodium polyoxyethylene alkyl (C=12, 13) ether sulfate (3E.O.), produced by Lion Corporation, active-ingredient: 28% by weight, number in parenthesis indicates an active-ingredient amount

*5: Sodium dodecylbenzenesulfate, produced by Kao Corporation, active-ingredient: 16% by weight, number in parenthesis indicates an active ingredient amount

*6: Fungicide, produced by Arch Chemicals, number in parenthesis indicates an active ingredient amount

*7: Self-dispersible magenta pigment, manufactured by Cabot Specialty Chemicals, number in parenthesis indicates pigment solid content Amount

*8: Self-dispersible cyan pigment, manufactured by Cabot Specialty Chemicals, number in parenthesis indicates pigment solid content amount

*9: Self-dispersible cyan pigment, manufactured by Cabot Specialty Chemicals, number in parenthesis indicates pigment solid content amount

*10: Self-dispersible yellow pigment, manufactured by Cabot Specialty Chemicals, number in parenthesis indicates pigment solid content Amount

*11: Self-dispersible yellow pigment, manufactured by Cabot Specialty Chemicals, number in parenthesis indicates pigment solid content Amount

*12: Self-dispersible black pigment, manufactured by Cabot Specialty Chemicals, number in parenthesis indicates pigment solid content amount

*13: Self-dispersible black pigment, manufactured by Cabot Specialty Chemicals, number in parenthesis indicates pigment solid content amount

TABLE 1

|  |  | EXAMPLES | | | | COMPARATIVE EXAMPLES | | | | |
|---|---|---|---|---|---|---|---|---|---|---|
|  |  | 1-1 | 1-2 | 1-3 | 1-4 | 1-1 | 1-2 | 1-3 | 1-4 | 1-5 |
| Water-based Ink Composition (% by weight) | CAB-O-JET (trade name) 465M (*1) | 5 | 5 | 5 | 5 | 5 | 5 | 5 | 5 | 5 |
|  | Glycerol | 29.8 | 29 | 28 | 28 | 30 | 28 | 28 | 28 | 28 |
|  | n-octyl-β-D-glucoside | 0.2 | 1 | 2 | — | — | — | — | — | — |
|  | n-decyl-β-D-glucoside | — | — | — | 2 | — | — | — | — | — |
|  | OLFINE (trade name) E1010 (*2) | — | — | — | — | — | 2 | — | — | — |
|  | EMULGEN (trade name) 150 (*3) | — | — | — | — | — | — | 2 | — | — |
|  | SUNNOL (trade name) NL-1430 (*4) | — | — | — | — | — | — | — | 2 | — |
|  | NEOPELEX (trade name) G-15 (*5) | — | — | — | — | — | — | — | — | 2 |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |
| Evaluation | Re-dispersion property | A | A | A | A | A | A | A | A | A |
|  | Vaporization property | A | A | A | A | A | C | C | C | C |
|  | Banding | B | A | A | A | C | A | A | C | C |
|  | Overall evaluation | G | G | G | G | NG | NG | NG | NG | NG |

TABLE 2

|  |  | EXAMPLES | | | | | | | |
|---|---|---|---|---|---|---|---|---|---|
|  |  | 1-5 | 1-6 | 1-7 | 1-8 | 1-9 | 1-10 | 1-11 | 1-12 |
| Water-based Ink Composition (% by weight) | CAB-O-JET (trade name) 260M (*7) | 5 | 5 | 5 | 5 | 5 | 5 | 5 | 5 |
|  | Glycerol | 29 | 28 | 23 | 29.5 | 29.3 | 29 | 28 | 25 |
|  | n-hexyl-β-D-glucoside | 1 | 2 | 7 | — | — | — | — | — |
|  | 2-ethylhexyl-β-D-glucoside | — | — | — | 0.5 | 0.7 | 1 | 2 | 5 |
|  | n-octyl-β-D-glucoside | — | — | — | — | — | — | — | — |
|  | Triethylene glycol-n-butyl ether | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 |
|  | Water | balance | balance | balance | balance | balance | balance | balance | balance |
| Evaluation | Re-dispersion property | A | A | A | A | A | A | A | A |
|  | Vaporization property | A | A | A | A | A | A | A | A |
|  | Banding | B | B | B | B | A | A | A | A |
|  | Overall evaluation | G | G | G | G | G | G | G | G |

|  |  | EXAMPLES | | | | | | | |
|---|---|---|---|---|---|---|---|---|---|
|  |  | 1-13 | 1-14 | 1-15 | 1-16 | 1-17 | 1-18 | 1-19 | 1-20 | 1-21 |
| Water-based Ink Composition (% by weight) | CAB-O-JET (trade name) 260M (*7) | 5 | 5 | 5 | 5 | 5 | 5 | 5 | 5 | 5 |
|  | Glycerol | 23 | 29.5 | 29.3 | 29 | 28 | 27 | 26 | 25 | 23 |
|  | n-hexyl-β-D-glucoside | — | — | — | — | — | — | — | — | — |
|  | 2-ethylhexyl-β-D-glucoside | 7 | — | — | — | — | — | — | — | — |
|  | n-octyl-β-D-glucoside | — | 0.5 | 0.7 | 1 | 2 | 3 | 4 | 5 | 7 |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |
| Evaluation | Re-dispersion property | A | A | A | A | A | A | A | A | A |
|  | Vaporization property | A | A | A | A | A | A | A | A | A |
|  | Banding | A | B | A | A | A | A | A | A | A |
|  | Overall evaluation | G | G | G | G | G | G | G | G | G |

TABLE 3

|  |  | EXAMPLES | | | | | | | | |
|---|---|---|---|---|---|---|---|---|---|---|
|  |  | 1-22 | 1-23 | 1-24 | 1-25 | 1-26 | 1-27 | 1-28 | 1-29 | 1-30 |
| Water-based Ink Composition (% by weight) | CAB-O-JET (trade name) 260M (*7) | 5 | 5 | 5 | 5 | 5 | 5 | 5 | 5 | 5 |
|  | Glycerol | 29.5 | 28 | 25 | 23 | 29.8 | 29.5 | 28 | 25 | 23 |
|  | n-decyl-β-D-glucoside | 0.5 | 2 | 5 | 7 | — | — | — | — | — |
|  | n-dodecyl-β-D-glucoside | — | — | — | — | 0.2 | 0.5 | 2 | 5 | 7 |
|  | OLFINE (trade name) E1010 (*2) | — | — | — | — | — | — | — | — | — |
|  | EMULGEN (trade name) 150 (*3) | — | — | — | — | — | — | — | — | — |
|  | SUNNOL (trade name) NL-1430 (*4) | — | — | — | — | — | — | — | — | — |
|  | NEOPELEX (trade name) G-15 (*5) | — | — | — | — | — | — | — | — | — |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |

TABLE 3-continued

|  |  | | | | | | | | | |
|---|---|---|---|---|---|---|---|---|---|---|
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |
| Evaluation | Re-dispersion property | A | A | A | B | A | A | A | A | B |
|  | Vaporization property | A | A | A | A | A | A | A | A | A |
|  | Banding | A | A | A | A | A | A | A | A | A |
|  | Overall evaluation | G | G | G | G | G | G | G | G | G |

| | | COMPARATIVE EXAMPLES | | | | | | | | |
|---|---|---|---|---|---|---|---|---|---|---|
| | | 1-6 | 1-7 | 1-8 | 1-9 | 1-10 | 1-11 | 1-12 | 1-13 | 1-14 |
| Water-based Ink Composition (% by weight) | CAB-O-JET (trade name) 260M (*7) | 5 | 5 | 5 | 5 | 5 | 5 | 5 | 5 | 5 |
|  | Glycerol | 30 | 29.3 | 28 | 29.3 | 28 | 29.3 | 28 | 29.3 | 28 |
|  | n-decyl-β-D-glucoside | — | — | — | — | — | — | — | — | — |
|  | n-dodecyl-β-D-glucoside | — | — | — | — | — | — | — | — | — |
|  | OLFINE (trade name) E1010 (*2) | — | 0.7 | 2 | — | — | — | — | — | — |
|  | EMULGEN (trade name) 150 (*3) | — | — | — | 0.7 | 2 | — | — | — | — |
|  | SUNNOL (trade name) NL-1430 (*4) | — | — | — | — | — | 0.7 | 2 | — | — |
|  | NEOPELEX (trade name) G-15 (*5) | — | — | — | — | — | — | — | 0.7 | 2 |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |
| Evaluation | Re-dispersion property | C | C | A | C | A | A | A | A | A |
|  | Vaporization property | C | C | C | C | C | A | A | A | A |
|  | Banding | C | A | A | A | A | C | C | C | C |
|  | Overall evaluation | NG | NG | NG | NG | NG | NG | NG | NG | NG |

TABLE 4

| | | EXAMPLES | | | | | | | COMPARATIVE EXAMPLES | |
|---|---|---|---|---|---|---|---|---|---|---|
| | | 2-1 | 2-2 | 2-3 | 2-4 | 2-5 | 2-6 | 2-7 | 2-1 | 2-2 |
| Water-based Ink Composition (% by weight) | CAB-O-JET (trade name) 250C (*8) | 5 | 5 | 5 | 5 | — | — | — | 5 | — |
|  | CAB-O-JET (trade name) 450C (*9) | — | — | — | — | 5 | 5 | 5 | — | 5 |
|  | Glycerol | 28 | 29 | 28 | 28 | 28 | 28 | 28 | 30 | 30 |
|  | n-hexyl-β-D-glucoside | 2 | — | — | — | 2 | — | — | — | — |
|  | n-octyl-β-D-glucoside | — | 1 | 2 | — | — | 2 | — | — | — |
|  | n-decyl-β-D-glucoside | — | — | — | 2 | — | — | 2 | — | — |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |
| Evaluation | Re-dispersion property | A | A | A | A | A | A | A | A | A |
|  | Vaporization property | A | A | A | A | A | A | A | A | A |
|  | Banding | B | A | A | A | B | A | A | C | C |
|  | Overall evaluation | G | G | G | G | G | G | G | NG | NG |

TABLE 5

| | | EXAMPLES | | | COMPARATIVE EXAMPLE |
|---|---|---|---|---|---|
| | | 3-1 | 3-2 | 3-3 | 3-1 |
| Water-based Ink Composition (% by weight) | CAB-O-JET (trade name) 470Y (*10) | 5 | 5 | 5 | 5 |
|  | Glycerol | 29.8 | 28 | 28 | 30 |
|  | n-octyl-β-D-glucoside | 0.2 | 2 | — | — |
|  | n-decyl-β-D-glucoside | — | — | 2 | — |
|  | Triethylene glycol-n-butyl ether | 1 | 1 | 1 | 1 |
|  | Proxel GXL(S) (*6) | 0.1 | 0.1 | 0.1 | 0.1 |
|  | 1,2,3-benzotriazole | 0.1 | 0.1 | 0.1 | 0.1 |
|  | Water | balance | balance | balance | balance |
| Evaluation | Re-dispersion property | A | A | A | A |
|  | Vaporization property | A | A | A | A |
|  | Banding | B | A | A | C |
|  | Overall evaluation | G | G | G | NG |

TABLE 6

|  |  | EXAMPLES | | | | | | | |
|---|---|---|---|---|---|---|---|---|---|
|  |  | 3-4 | 3-5 | 3-6 | 3-7 | 3-8 | 3-9 | 3-10 | 3-11 |
| Water-based Ink Composition (% by weight) | CAB-O-JET (trade name) 270Y (*11) | 5 | 5 | 5 | 5 | 5 | 5 | 5 | 5 |
|  | Glycerol | 29 | 28 | 23 | 29.3 | 29 | 28 | 25 | 23 |
|  | n-hexyl-β-D-glucoside | 1 | 2 | 7 | — | — | — | — | — |
|  | 2-ethylhexyl-β-D-glucoside | — | — | — | 0.7 | 1 | 2 | 5 | 7 |
|  | n-octyl-β-D-glucoside | — | — | — | — | — | — | — | — |
|  | Triethylene glycol-n-butyl ether | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 |
|  | Water | balance | balance | balance | balance | balance | balance | balance | balance |
| Evaluation | Re-dispersion property | A | A | A | A | A | A | A | A |
|  | Vaporization property | A | A | A | A | A | A | A | A |
|  | Banding | B | B | B | A | A | A | A | A |
|  | Overall evaluation | G | G | G | G | G | G | G | G |

|  |  | EXAMPLES | | | | | | |
|---|---|---|---|---|---|---|---|---|
|  |  | 3-12 | 3-13 | 3-14 | 3-15 | 3-16 | 3-17 | 3-18 |
| Water-based Ink Composition (% by weight) | CAB-O-JET (trade name) 270Y (*11) | 5 | 5 | 5 | 5 | 5 | 5 | 5 |
|  | Glycerol | 29.3 | 29 | 28 | 27 | 26 | 25 | 23 |
|  | n-hexyl-β-D-glucoside | — | — | — | — | — | — | — |
|  | 2-ethylhexyl-β-D-glucoside | — | — | — | — | — | — | — |
|  | n-octyl-β-D-glucoside | 0.7 | 1 | 2 | 3 | 4 | 5 | 7 |
|  | Triethylene glycol-n-butyl ether | 1 | 1 | 1 | 1 | 1 | 1 | 1 |
|  | Proxel GXL(S) (*6) | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 |
|  | Water | balance | balance | balance | balance | balance | balance | balance |
| Evaluation | Re-dispersion property | A | A | A | A | A | A | A |
|  | Vaporization property | A | A | A | A | A | A | A |
|  | Banding | A | A | A | A | A | A | A |
|  | Overall evaluation | G | G | G | G | G | G | G |

TABLE 7

|  |  | EXAMPLES | | | | | | | | |
|---|---|---|---|---|---|---|---|---|---|---|
|  |  | 3-19 | 3-20 | 3-21 | 3-22 | 3-23 | 3-24 | 3-25 | 3-26 | 3-27 |
| Water-based Ink Composition (% by weight) | CAB-O-JET (trade name) 270Y (*11) | 5 | 5 | 5 | 5 | 5 | 5 | 5 | 5 | 5 |
|  | Glycerol | 29.5 | 28 | 25 | 23 | 29.8 | 29.5 | 28 | 25 | 23 |
|  | n-decyl-β-D-glucoside | 0.5 | 2 | 5 | 7 | — | — | — | — | — |
|  | n-dodecyl-β-D-glucoside | — | — | — | — | 0.2 | 0.5 | 2 | 5 | 7 |
|  | OLFINE (trade name) E1010 (*2) | — | — | — | — | — | — | — | — | — |
|  | EMULGEN (trade name) 150 (*3) | — | — | — | — | — | — | — | — | — |
|  | SUNNOL (trade name) NL-1430 (*4) | — | — | — | — | — | — | — | — | — |
|  | NEOPELEX (trade name) G-15 (*5) | — | — | — | — | — | — | — | — | — |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |
| Evaluation | Re-dispersion property | A | A | A | B | A | A | A | A | B |
|  | Vaporization property | A | A | A | A | A | A | A | A | A |
|  | Banding | A | A | A | A | A | A | A | A | A |
|  | Overall evaluation | G | G | G | G | G | G | G | G | G |

|  |  | COMPARATIVE EXAMPLES | | | | | | | | |
|---|---|---|---|---|---|---|---|---|---|---|
|  |  | 3-2 | 3-3 | 3-4 | 3-5 | 3-6 | 3-7 | 3-8 | 3-9 | 3-10 |
| Water-based Ink Composition (% by weight) | CAB-O-JET (trade name) 270Y (*11) | 5 | 5 | 5 | 5 | 5 | 5 | 5 | 5 | 5 |
|  | Glycerol | 30 | 29.3 | 28 | 29.3 | 28 | 29.3 | 28 | 29.3 | 28 |
|  | n-decyl-β-D-glucoside | — | — | — | — | — | — | — | — | — |
|  | n-dodecyl-β-D-glucoside | — | — | — | — | — | — | — | — | — |
|  | OLFINE (trade name) E1010 (*2) | — | 0.7 | 2 | — | — | — | — | — | — |
|  | EMULGEN (trade name) 150 (*3) | — | — | — | 0.7 | 2 | — | — | — | — |
|  | SUNNOL (trade name) NL-1430 (*4) | — | — | — | — | — | 0.7 | 2 | — | — |
|  | NEOPELEX (trade name) G-15 (*5) | — | — | — | — | — | — | — | 0.7 | 2 |
|  | Triethylene glycol-n-butyl ether | 1 | 1 | 1 | 1 | 1 | 1 | 1 | 1 | 1 |
|  | Proxel GXL(S) (*6) | 0.1 | 0.1 | 0.1 | 0.1 | 0.1 | 0.1 | 0.1 | 0.1 | 0.1 |
|  | 1,2,3-benzotriazole | 0.1 | 0.1 | 0.1 | 0.1 | 0.1 | 0.1 | 0.1 | 0.1 | 0.1 |
|  | Water | balance | balance | balance | balance | balance | balance | balance | balance | balance |

TABLE 7-continued

| Evaluation | Re-dispersion property | C | A | A | C | C | C | C | C | C |
|---|---|---|---|---|---|---|---|---|---|---|
| | Vaporization property | C | C | C | C | C | C | C | C | C |
| | Banding | C | A | A | A | A | C | C | C | C |
| | Overall evaluation | NG | NG | NG | NG | NG | NG | NG | NG | NG |

TABLE 8

| | | EXAMPLES | | | | | | | |
|---|---|---|---|---|---|---|---|---|---|
| | | 4-1 | 4-2 | 4-3 | 4-4 | 4-5 | 4-6 | 4-7 | 4-8 |
| Water-based Ink Composition (% by weight) | CAB-O-JET (trade name) 300 (*12) | 5 | 5 | 5 | 5 | — | — | — | — |
| | CAB-O-JET (trade name) 400 (*13) | — | — | — | — | 5 | 5 | 5 | 5 |
| | Glycerol | 28 | 29 | 28 | 28 | 28 | 29 | 28 | 28 |
| | n-hexyl-β-D-glucoside | 2 | — | — | — | 2 | — | — | — |
| | n-octyl-β-D-glucoside | — | 1 | 2 | — | — | 1 | 2 | — |
| | n-decyl-β-D-glucoside | — | — | — | 2 | — | — | — | 2 |
| | Triethylene glycol-n-butyl ether | 1 | 1 | 1 | 1 | 1 | 1 | 1 | 1 |
| | Proxel GXL(S) (*6) | 0.1 | 0.1 | 0.1 | 0.1 | 0.1 | 0.1 | 0.1 | 0.1 |
| | 1,2,3-benzotriazole | 0.1 | 0.1 | 0.1 | 0.1 | 0.1 | 0.1 | 0.1 | 0.1 |
| | Water | balance | balance | balance | balance | balance | balance | balance | balance |
| Evaluation | Re-dispersion property | A | A | A | A | A | A | A | A |
| | Vaporization property | A | A | A | A | A | A | A | A |
| | Banding | B | A | A | A | B | A | A | A |
| | Overall evaluation | G | G | G | G | G | G | G | G |

| | | COMPARATIVE EXAMPLES | |
|---|---|---|---|
| | | 4-1 | 4-2 |
| Water-based Ink Composition (% by weight) | CAB-O-JET (trade name) 300 (*12) | 5 | — |
| | CAB-O-JET (trade name) 400 (*13) | — | 5 |
| | Glycerol | 30 | 30 |
| | n-hexyl-β-D-glucoside | — | — |
| | n-octyl-β-D-glucoside | — | — |
| | n-decyl-β-D-glucoside | — | — |
| | Triethylene glycol-n-butyl ether | 1 | 1 |
| | Proxel GXL(S) (*6) | 0.1 | 0.1 |
| | 1,2,3-benzotriazole | 0.1 | 0.1 |
| | Water | balance | balance |
| Evaluation | Re-dispersion property | A | A |
| | Vaporization property | A | A |
| | Banding | C | C |
| | Overall evaluation | NG | NG |

As shown in Tables 1 to 3, all of the results of evaluations of the re-dispersion property, the vaporization property, and the white-striped unevenness (banding) were good in each of Examples 1-1 to 1-30 in which the water-based magenta ink was used. Especially, all of the results of evaluations of the re-dispersion property, the vaporization property, and the white-striped unevenness (banding) were evaluated as "A" in each of Examples 1-2 to 1-4, 1-9 to 1-13, 1-15 to 1-24, and 1-26 to 1-29 in which the ratio of the alkyl glucoside was 0.7% by weight to 7% by weight when the alkyl glucoside had the alkyl group having 8 carbon atoms; the ratio of the alkyl glucoside was 0.5% by weight to 5% by weight when the alkyl glucoside had the alkyl group having 10 carbon atoms; and the ratio of the alkyl glucoside was 0.2% by weight to 5% by weight when the alkyl glucoside had the alkyl group having 12 carbon atoms. Meanwhile, the result of evaluation of the white-striped unevenness (banding) was bad in Comparative Example 1-1 in which no alkyl glucoside was used, and all of the results of evaluations of the re-dispersion property, the vaporization property, and the white-striped unevenness (banding) were bad in Comparative Example 1-6 in which no alkyl glucoside was used. The result of evaluation of the vaporization property was bad in each of Comparative Examples 1-2, 1-3, 1-8, and 1-10 in which another surfactant was used instead of the alkyl glucoside described above. The results of evaluations of the vaporization property and the white-striped unevenness (banding) were bad in each of Comparative Examples 1-4 and 1-5 in which another surfactant was used instead of the alkyl glucoside described above. The results of evaluations of re-dispersion property and the vaporization property were bad in each of Comparative Examples 1-7 and 1-9 in which another surfactant was used instead of the alkyl glucoside described above. The result of evaluation of the white-striped unevenness (banding) was bad in each of Comparative Examples 1-11 to 1-14 in which another surfactant was used instead of the alkyl glucoside described above.

As shown in Table 4, all of the results of evaluations of the re-dispersion property, the vaporization property, and the white-striped unevenness (banding) were good in each of Examples 2-1 to 2-7 in which the water-based cyan ink was used. Especially, all of the results of evaluations of the re-dispersion property, the vaporization property, and the white-striped unevenness (banding) were evaluated as "A" in each of Examples 2-2 to 2-4, 2-6, and 2-7 in which the ratio of the alkyl glucoside was 0.7% by weight to 7% by weight when the alkyl glucoside had the alkyl group having 8 carbon atoms; the ratio of the alkyl glucoside was 0.5% by weight to 5% by weight when the alkyl glucoside had the alkyl group having 10 carbon atoms; and the ratio of the alkyl glucoside was 0.2% by weight to 5% by weight when the alkyl glucoside had the alkyl group having 12 carbon atoms. Meanwhile, the result of evaluation of the white-striped unevenness (banding) was bad in each of Comparative Examples 2-1 and 2-2 in which no alkyl glucoside was used.

As shown in Tables 5 to 7, all of the results of evaluations of the re-dispersion property, the vaporization property, and the white-striped unevenness (banding) were good in each of Examples 3-1 to 3-27 in which the water-based yellow ink was used. Especially, all of the results of evaluations of the re-dispersion property, the vaporization property, and the white-striped unevenness (banding) were evaluated as "A" in each of Examples 3-2, 3-3, 3-7 to 3-21, and 3-23 to 3-26 in which the ratio of the alkyl glucoside was 0.7% by weight to 7% by weight when the alkyl glucoside had the alkyl group having 8 carbon atoms; the ratio of the alkyl glucoside was 0.5% by weight to 5% by weight when the alkyl glucoside had the alkyl group having 10 carbon atoms; and the ratio of the alkyl glucoside was 0.2% by weight to 5% by weight when the alkyl glucoside had the alkyl group having 12 carbon atoms. Meanwhile, the result of evaluation of the white-striped unevenness (banding) was bad in Comparative Example 3-1 in which no alkyl glucoside was used. All of the results of evaluations of the re-dispersion property, the vaporization property, and the white-striped unevenness (banding) were bad in Comparative Example 3-2 in which no alkyl glucoside was used. The result of evaluation of the vaporization property was bad in each of Comparative Examples 3-3 and 3-4 in which another surfactant was used instead of the alkyl glucoside described above. The results of evaluations of re-dispersion property and the vaporization property were bad in each of Comparative Examples 3-5 and 3-6 in which another surfactant was used instead of the alkyl glucoside described above. All of the results of evaluations of the re-dispersion property, the vaporization property, and the white-striped unevenness (banding) were bad in each of Comparative Examples 3-7 to 3-10 in which another surfactant was used instead of the alkyl glucoside described above.

As shown in Table 8, all of the results of evaluations of the re-dispersion property, the vaporization property, and the white-striped unevenness (banding) were good in each of Examples 4-1 to 4-8 in which the water-based black ink was used. Especially, all of the results of evaluations of the re-dispersion property, the vaporization property, and the white-striped unevenness (banding) were evaluated as "A" in each of Examples 4-2 to 4-4 and 4-6 to 4-8 in which the ratio of the alkyl glucoside was 0.7% by weight to 7% by weight when the alkyl glucoside had the alkyl group having 8 carbon atoms; the ratio of the alkyl glucoside was 0.5% by weight to 5% by weight when the alkyl glucoside had the alkyl group having 10 carbon atoms; and the ratio of the alkyl glucoside was 0.2% by weight to 5% by weight when the alkyl glucoside had the alkyl group having 12 carbon atoms. Meanwhile, the result of evaluation of the white-striped unevenness (banding) was bad in each of Comparative Examples 4-1 and 4-2 in which no alkyl glucoside was used.

As described above, the water-based ink of the present teaching has the excellent re-dispersion property and the satisfactory vaporization property. Further, a recorded image in which the white-striped unevenness (banding) is suppressed can be obtained by using the water-based ink of the present teaching. The usage of the water-based ink of the present teaching is not particularly limited and is widely applicable to a variety of kinds of ink jet recording.

Examples 5-1 to 8-2 and Comparative Examples 5-1 to 8-1

Components except for a self-dispersible pigment, which were included in the Water-based Ink Composition (Tables 10 to 14), were mixed uniformly or homogeneously; and thus an ink solvent was obtained. Subsequently, the ink solvent was added to each of the self-dispersible pigment water dispersions, followed by being mixed uniformly. After that, the obtained mixtures were each filtrated through a cellulose acetate membrane filter (pore size 3.00 μm) produced by Toyo Roshi Kaisha, Ltd., and thus the water-based inks for ink jet recording of Examples 5-1 to 8-2 and Comparative Examples 5-1 to 8-1 were obtained.

With respect to the water-based inks of Examples 5-1 to 8-2 and Comparative Examples 5-1 to 8-1, (a) evaluation of re-dispersion property was performed as described above, and (e) evaluation of an optical density (OD value) and (f) overall evaluation were further performed by the following methods.

(e) Evaluation of Optical Density (OD Value)

The water-based inks of Examples and Comparative Examples were each applied on a plain paper (Hammermill Laser Print 24Ib, produced by International Paper Company), in an approximately 5 cm horizontal-by-approximately 10 cm vertical area, at a rate of approximately 20 g/m², using a bar coater. Then, the applied water-based inks were each dried to prepare evaluation samples. The optical density (OD value) of each of the evaluation samples was measured by a spectrophotometric colorimetry meter SpectroEye (light source: $D_{50}$; field: 2 degrees; density: ANSI T) produced by X-Rite, Incorporated, and the optical density (OD value) of each of the evaluation samples was evaluated in accordance with the following evaluation criteria.

<Evaluation Criteria for Optical Density (OD Value) Evaluation>

TABLE 9

| Water-based magenta ink | Water-based yellow ink |
|---|---|
| A: OD value is not less than 0.83 | A: OD value is not less than 0.83 |
| B: OD value is not less than 0.79 and less than 0.83 | B: OD value is not less than 0.79 and less than 0.83 |
| C: OD value is less than 0.79 | C: OD value is less than 0.79 |
| Water-based cyan ink | Water-based black ink |
| A: OD value is not less than 1.05 | A: OD value is not less than 1.04 |
| B: OD value is not less than 1.01 and less than 1.05 | B: OD value is not less than 1.00 and less than 1.04 |
| C: OD value is less than 1.01 | C: OD value is less than 1.00 |

(f) Overall Evaluation

With respect to each of the water-based inks, the overall evaluation was performed in accordance with the following evaluation criteria based on the results of (a) and (e) described above.

<Evaluation Criteria for Overall Evaluation>

G: Both of the evaluation results of (a) and (e) were evaluated as "B" or above.

NG: Any of the evaluation results of (a) and (e) was evaluated as "C" or below.

The water-based ink compositions and the evaluation results of the water-based inks of Examples 5-1 to 8-2 and Comparative Examples 5-1 to 8-1 are shown in Table 10 to Table 14.

Tables 10-14 (Following) Legend

*1: Self-dispersible magenta pigment, manufactured by Cabot Specialty Chemicals, number in parenthesis indicates pigment solid content amount
*2: Acethylene diol ethylene oxide (10 mol) adduct, produced by Nissin Chemical Industry Co., Ltd.
*3: Nonionic surfactant, produced by Kao Corporation, number in parenthesis indicates an active ingredient amount
*4: Sodium polyoxyethylene alkyl (C=12, 13) ether sulfate (3E.O.), produced by Lion Corporation, active-ingredient: 28% by weight, number in parenthesis indicates an active-ingredient amount
*5: Sodium dodecylbenzenesulfate, produced by Kao Corporation, active-ingredient: 16% by weight, number in parenthesis indicates an active ingredient amount
*6: Fungicide, produced by Arch Chemicals
*7: Self-dispersible magenta pigment, manufactured by Cabot Specialty Chemicals, number in parenthesis indicates pigment solid content amount
*8: Self-dispersible cyan pigment, manufactured by Cabot Specialty Chemicals, number in parenthesis indicates pigment solid content amount
*9: Self-dispersible cyan pigment, manufactured by Cabot Specialty Chemicals, number in parenthesis indicates pigment solid content amount
*10: Self-dispersible yellow pigment, manufactured by Cabot Specialty Chemicals, number in parenthesis indicates pigment solid content amount
*12: Self-dispersible black pigment, manufactured by Cabot Specialty Chemicals, number in parenthesis indicates pigment solid content amount
*14: Nonionic surfactant, produced by Dai-ichi Kogyo Seiyaku Co. Ltd.

TABLE 10

| | | EXAMPLES | | | | | | | | |
|---|---|---|---|---|---|---|---|---|---|---|
| | | 5-1 | 5-2 | 5-3 | 5-4 | 5-5 | 5-6 | 5-7 | 5-8 | 5-9 |
| Water-based Ink Composition (% by weight) | CAB-O-JET (trade name) 465M (*1) | 5 | 5 | 5 | 5 | 5 | 5 | 5 | 5 | 5 |
| | Glycerol | 14.8 | 14.6 | 14.3 | 12 | 10 | 8 | 5 | 14.3 | 14.3 |
| | 1,2HDL | 15 | 15 | 15 | 15 | 15 | 15 | 15 | — | — |
| | 1,2PeDL | — | — | — | — | — | — | — | 15 | — |
| | 1,2BD | — | — | — | — | — | — | — | — | 15 |
| | 1,2-propanediol | — | — | — | — | — | — | — | — | — |
| | 1,2-ethanediol | — | — | — | — | — | — | — | — | — |
| | n-octyl-β-D-glucoside | 0.2 | 0.4 | 0.7 | 3 | 5 | 7 | 10 | 0.7 | 0.7 |
| | EMULGEN (trade name) 150 (*3) | — | — | — | — | — | — | — | — | — |
| | DK ESTER (trade name) F-160 (*14) | — | — | — | — | — | — | — | — | — |
| | SUNNOL (trade name) NL-1430 (*4) | — | — | — | — | — | — | — | — | — |
| | NEOPELEX (trade name) G-15 (*5) | — | — | — | — | — | — | — | — | — |
| | Triethylene glycol-n-butyl ether | 1 | 1 | 1 | 1 | 1 | 1 | 1 | 1 | 1 |
| | Proxel GXL(S) (*6) | 0.1 | 0.1 | 0.1 | 0.1 | 0.1 | 0.1 | 0.1 | 0.1 | 0.1 |
| | Water | balance | balance | balance | balance | balance | balance | balance | balance | balance |
| Evaluation | Optical density (OD value) | B | B | A | A | A | A | A | B | B |
| | Re-dispersion property | A | A | A | A | A | A | A | A | A |
| | Overall evaluation | G | G | G | G | G | G | G | G | G |

| | | EXAMPLES | | | | | COMPARATIVE EXAMPLES | | | |
|---|---|---|---|---|---|---|---|---|---|---|
| | | 5-10 | 5-11 | 5-12 | 5-13 | 5-14 | 5-1 | 5-2 | 5-3 | 5-4 |
| Water-based Ink Composition (% by weight) | CAB-O-JET (trade name) 465M (*1) | 5 | 5 | 5 | 5 | 5 | 5 | 5 | 5 | 5 |
| | Glycerol | 24.3 | 19.3 | 9.3 | 4.3 | — | 14.3 | 14.3 | 29.3 | 14.3 |
| | 1,2HDL | 5 | 10 | 20 | 25 | 30 | — | — | — | 15 |
| | 1,2PeDL | — | — | — | — | — | — | — | — | — |
| | 1,2BD | — | — | — | — | — | — | — | — | — |
| | 1,2-propanediol | — | — | — | — | — | 15 | — | — | — |
| | 1,2-ethanediol | — | — | — | — | — | — | 15 | — | — |
| | n-octyl-β-D-glucoside | 0.7 | 0.7 | 0.7 | 0.7 | 0.7 | 0.7 | 0.7 | 0.7 | — |
| | EMULGEN (trade name) 150 (*3) | — | — | — | — | — | — | — | — | 0.7 |
| | DK ESTER (trade name) F-160 (*14) | — | — | — | — | — | — | — | — | — |
| | SUNNOL (trade name) NL-1430 (*4) | — | — | — | — | — | — | — | — | — |
| | NEOPELEX (trade name) G-15 (*5) | — | — | — | — | — | — | — | — | — |
| | Triethylene glycol-n-butyl ether | 1 | 1 | 1 | 1 | 1 | 1 | 1 | 1 | 1 |
| | Proxel GXL(S) (*6) | 0.1 | 0.1 | 0.1 | 0.1 | 0.1 | 0.1 | 0.1 | 0.1 | 0.1 |
| | Water | balance | balance | balance | balance | balance | balance | balance | balance | balance |
| Evaluation | Optical density (OD value) | B | B | A | A | A | C | C | C | B |
| | Re-dispersion property | A | A | A | A | A | A | A | A | C |
| | Overall evaluation | G | G | G | G | G | NG | NG | NG | NG |

| | | COMPARATIVE EXAMPLES | | | |
|---|---|---|---|---|---|
| | | 5-5 | 5-6 | 5-7 | 5-8 |
| Water-based Ink Composition (% by weight) | CAB-O-JET (trade name) 465M (*1) | 5 | 5 | 5 | 5 |
| | Glycerol | 14.3 | 14.3 | 14.3 | 30 |
| | 1,2HDL | 15 | 15 | 15 | — |
| | 1,2PeDL | — | — | — | — |
| | 1,2BD | — | — | — | — |
| | 1,2-propanediol | — | — | — | — |
| | 1,2-ethanediol | — | — | — | — |
| | n-octyl-β-D-glucoside | — | — | — | — |

TABLE 10-continued

|  |  |  |  |  |  |
|---|---|---|---|---|---|
|  | EMULGEN (trade name) 150 (*3) | — | — | — | — |
|  | DK ESTER (trade name) F-160 (*14) | 0.7 | — | — | — |
|  | SUNNOL (trade name) NL-1430 (*4) | — | 0.7 | — | — |
|  | NEOPELEX (trade name) G-15 (*5) | — | — | 0.7 | — |
|  | Triethylene glycol-n-butyl ether | 1 | 1 | 1 | 1 |
|  | Proxel GXL(S) (*6) | 0.1 | 0.1 | 0.1 | 0.1 |
|  | Water | balance | balance | balance | balance |
| Evaluation | Optical density (OD value) | A | A | B | C |
|  | Re-dispersion property | C | C | C | A |
|  | Overall evaluation | NG | NG | NG | NG |

TABLE 11

|  |  | EXAMPLES | | | | | |
|---|---|---|---|---|---|---|---|
|  |  | 5-15 | 5-16 | 5-17 | 5-18 | 5-19 | 5-20 |
| Water-based Ink Composition (% by weight) | CAB-O-JET (trade name) 260M (*7) | 5 | 5 | 5 | 5 | 5 | 5 |
|  | Glycerol | 14.3 | 14.3 | 14.3 | 14.3 | 19.3 | 9.3 |
|  | 1,2HDL | 15 | 15 | 15 | 15 | 10 | 20 |
|  | n-butyl-β-D-glucoside | — | — | — | — | — | — |
|  | n-hexyl-β-D-glucoside | 0.7 | — | — | — | — | — |
|  | 2-ethylhexyl-β-D-glucoside | — | 0.7 | — | — | — | — |
|  | n-octyl-β-D-glucoside | — | — | 0.7 | — | 0.7 | 0.7 |
|  | n-dodecyl-β-D-glucoside | — | — | — | 0.7 | — | — |
|  | EMULGEN (trade name) 150 (*3) | — | — | — | — | — | — |
|  | OLFINE (trade name) E1010 (*2) | — | — | — | — | — | — |
|  | Triethylene glycol-n-butyl ether | 1 | 1 | 1 | 1 | 1 | 1 |
|  | Proxel GXL(S) (*6) | 0.1 | 0.1 | 0.1 | 0.1 | 0.1 | 0.1 |
|  | Water | balance | balance | balance | balance | balance | balance |
| Evaluation | Optical density (OD value) | A | A | A | A | B | A |
|  | Re-dispersion property | A | A | A | A | A | A |
|  | Overall evaluation | G | G | G | G | G | G |

|  |  | COMPARATIVE EXAMPLES | | | | |
|---|---|---|---|---|---|---|
|  |  | 5-9 | 5-10 | 5-11 | 5-12 | 5-13 |
| Water-based Ink Composition (% by weight) | CAB-O-JET (trade name) 260M (*7) | 5 | 5 | 5 | 5 | 5 |
|  | Glycerol | 14.3 | 29.3 | 14.8 | 14.8 | 30 |
|  | 1,2HDL | 15 | — | 15 | 15 | — |
|  | n-butyl-β-D-glucoside | 0.7 | — | — | — | — |
|  | n-hexyl-β-D-glucoside | — | — | — | — | — |
|  | 2-ethylhexyl-β-D-glucoside | — | — | — | — | — |
|  | n-octyl-β-D-glucoside | — | 0.7 | — | — | — |
|  | n-dodecyl-β-D-glucoside | — | — | — | — | — |
|  | EMULGEN (trade name) 150 (*3) | — | — | 0.2 | — | — |
|  | OLFINE (trade name) E1010 (*2) | — | — | — | 0.2 | — |
|  | Triethylene glycol-n-butyl ether | 1 | 1 | 1 | 1 | 1 |
|  | Proxel GXL(S) (*6) | 0.1 | 0.1 | 0.1 | 0.1 | 0.1 |
|  | Water | balance | balance | balance | balance | balance |
| Evaluation | Optical density (OD value) | A | C | A | A | C |
|  | Re-dispersion property | C | A | C | C | A |
|  | Overall evaluation | NG | NG | NG | NG | NG |

TABLE 12

|  |  | EXAMPLES | | COMPARATIVE EXAMPLE |
|---|---|---|---|---|
|  |  | 6-1 | 6-2 | 6-1 |
| Water-based Ink Composition (% by weight) | CAB-O-JET (trade name) 470Y (*10) | 5 | 5 | 5 |
|  | Glycerol | 24.3 | 14.3 | 29.3 |
|  | 1,2HDL | 5 | 15 | — |
|  | n-octyl-β-D-glucoside | 0.7 | 0.7 | 0.7 |
|  | Triethylene glycol-n-butyl ether | 1 | 1 | 1 |
|  | Proxel GXL(S) (*6) | 0.1 | 0.1 | 0.1 |
|  | Water | balance | balance | balance |

TABLE 12-continued

|  |  | EXAMPLES | | COMPARATIVE EXAMPLE |
|---|---|---|---|---|
|  |  | 6-1 | 6-2 | 6-1 |
| Evaluation | Optical density (OD value) | B | A | C |
|  | Re-dispersion property | A | A | A |
|  | Overall evaluation | G | G | NG |

TABLE 13

|  |  | EXAMPLES | | | COMPARATIVE EXAMPLES | |
|---|---|---|---|---|---|---|
|  |  | 7-1 | 7-2 | 7-3 | 7-1 | 7-2 |
| Water-based Ink Composition (% by weight) | CAB-O-JET (trade name) 250C (*8) | 5 | — | — | 5 | — |
|  | CAB-O-JET (trade name) 450C (*9) | — | 5 | 5 | — | 5 |
|  | Glycerol | 14.3 | 24.3 | 14.3 | 29.3 | 29.3 |
|  | 1,2HDL | 15 | 5 | 15 | — | — |
|  | n-octyl-β-D-glucoside | 0.7 | 0.7 | 0.7 | 0.7 | 0.7 |
|  | Triethylene glycol-n-butyl ether | 1 | 1 | 1 | 1 | 1 |
|  | Proxel GXL(S) (*6) | 0.1 | 0.1 | 0.1 | 0.1 | 0.1 |
|  | Water | balance | balance | balance | balance | balance |
| Evaluation | Optical density (OD value) | A | B | A | C | C |
|  | Re-dispersion property | A | A | A | A | A |
|  | Overall evaluation | G | G | G | NG | NG |

TABLE 14

|  |  | EXAMPLES | | COMPARATIVE EXAMPLE |
|---|---|---|---|---|
|  |  | 8-1 | 8-2 | 8-1 |
| Water-based Ink Composition (% by weight) | CAB-O-JET (trade name) 300 (*12) | 5 | 5 | 5 |
|  | Glycerol | 24.3 | 14.3 | 29.3 |
|  | 1,2HDL | 5 | 15 | — |
|  | n-octyl-β-D-glucoside | 0.7 | 0.7 | 0.7 |
|  | Triethylene glycol-n-butyl ether | 1 | 1 | 1 |
|  | Proxel GXL(S) (*6) | 0.1 | 0.1 | 0.1 |
|  | Water | balance | balance | balance |
| Evaluation | Optical density (OD value) | B | A | C |
|  | Re-dispersion property | A | A | A |
|  | Overall evaluation | G | G | NG |

As shown in Table 10 and Table 11, the results of evaluations of the optical density (OD value) and the re-dispersion property were good in each of Examples 5-5 to 1-20 in which the water-based magenta ink was used. The results of evaluations of the optical density (OD value) and the re-dispersion property were especially good in each of Examples 5-3 to 5-7, 5-12 to 5-18, and 5-20 in which the alkanediol had 6 carbon atoms; the ratio of the alkanediol was not less than 15% by weight; and the ratio of the alkyl glucoside was not less than 0.7% by weight. Meanwhile, the result of evaluation of the optical density (OD value) was bad in each of Comparative Examples 5-1 and 5-2 in which the 1,2-alkanediol having 2 or 3 carbon atoms was used instead of the alkanediol described above and each of Comparative Examples 5-3, 5-8, 5-10, and 5-13 in which no alkanediol was used. The result of evaluation of the re-dispersion property was bad in each of Comparative Examples 5-4 to 5-7, 5-11, and 5-12 in which another surfactant or alkyl glucoside having 4 carbon atoms was used instead of the alkyl glucoside described above.

As shown in Table 12, the results of evaluations of the optical density (OD value) and the re-dispersion property were good in each of Examples 6-1 and 6-2 in which the water-based yellow ink was used. The results of evaluations of the optical density (OD value) and the re-dispersion property were especially good in Example 6-2 in which the alkanediol had 6 carbon atoms; the ratio of the alkanediol was 15% by weight; and the ratio of the alkyl glucoside was 0.7% by weight. Meanwhile, the result of evaluation of the optical density (OD value) was bad in Comparative Example 6-1 in which no alkanediol was used.

As shown in Table 13, the results of evaluations of the optical density (OD value) and the re-dispersion property were good in each of Examples 7-1 to 7-3 in which the water-based cyan ink was used. The results of evaluations of the optical density (OD value) and the re-dispersion property were especially good in each of Examples 7-1 and 7-3 in which the alkanediol had 6 carbon atoms; the ratio of the alkanediol was 15% by weight; and the ratio of the alkyl glucoside was 0.7% by weight. Meanwhile, the result of evaluation of the optical density (OD value) was bad in each of Comparative Examples 7-1 and 7-2 in which no alkanediol was used.

As shown in Table 14, the results of evaluations of the optical density (OD value) and the re-dispersion property were good in each of Examples 8-1 and 8-2 in which the water-based black ink was used. The results of evaluations of the optical density (OD value) and the re-dispersion property were especially good in Example 8-2 in which the alkanediol had 6 carbon atoms; the ratio of the alkanediol was 15% by weight; and the ratio of the alkyl glucoside was 0.7% by weight. Meanwhile, the result of evaluation of the optical density (OD value) was bad in Comparative Example 8-1 in which no alkanediol was used.

As described above, the water-based ink of the present teaching has the excellent optical density (OD value) and the satisfactory re-dispersion property. The usage of the water-based ink of the present teaching is not particularly limited and is widely applicable to a variety of kinds of ink jet recording.

The water-based inks of Examples 5-1 to 8-2 were not subjected to the evaluations of the vaporization property and the white-striped unevenness (banding). Each of the water-based inks of Examples 5-1 to 8-2, however, includes the alkyl glucoside described above. Thus, it is assumed that each of the water-based inks of Examples 5-1 to 8-2 has the excellent vaporization property and a recorded image in which the white-striped unevenness (banding) is suppressed can be obtained by using each of the water-based inks of Examples 5-1 to 8-2.

What is claimed is:

1. A water-based ink for ink-jet recording comprising:
   a pigment;
   water; and
   alkyl glucoside which has alkyl group having 8 to 12 carbon atoms,
   wherein the alkyl glucoside is contained in the water-based ink in an amount of not less than 0.7% by weight and not more than 5% by weight.

2. The water-based ink for ink-jet recording according to claim 1, wherein the alkyl glucoside has alkyl group having 8 carbon atoms.

3. The water-based ink for ink-jet recording according to claim 1, wherein the alkyl glucoside has alkyl group having 10 carbon atoms.

4. The water-based ink for ink-jet recording according to claim 1, wherein the alkyl glucoside has alkyl group having 12 carbon atoms.

5. The water-based ink for ink-jet recording according to claim 1, wherein the alkyl glucoside is selected from the group consisting of 2 ethylhexyl-β-D-glucoside, n-decyl-β-D-glucoside, n-dodecyl-β-D-glucoside, and a combination thereof.

6. The water-based ink for ink-jet recording according to claim 1, wherein the alkyl glucoside has alkyl group having 8 or 10 carbon atoms.

7. The water-based ink for ink-jet recording according to claim 6, wherein the alkyl glucoside is selected from the group consisting of 2-ethylhexyl-β-D-glucoside, n-octyl-β-D-glucoside, n-decyl-β-D-glucoside, and a combination thereof.

8. The water-based ink for ink-jet recording according to claim 1, further comprising 1,2-alkanediol having 4 to 6 carbon atoms.

9. An ink cartridge containing the water-based ink for ink-jet recording as defined in claim 1.

10. An ink-jet recording apparatus comprising:
    the water-based ink for ink-jet recording as defined in claim 1;
    an ink accommodating section in which the water-based ink is accommodated; and
    an ink discharge mechanism which is configured to discharge the water-based ink accommodated in the ink accommodating section.

11. A water-based ink for ink-jet recording comprising:
    a pigment;
    water;
    alkyl glucoside which has alkyl group having 6 or more carbon atoms; and
    1,2-alkanediol having 4 to 6 carbon atoms.

12. The water-based ink for ink-jet recording according to claim 11, wherein the alkyl glucoside has alkyl group having 8 to 12 carbon atoms.

13. The water-based ink for ink-jet recording according to claim 11, wherein the alkyl glucoside is contained by 0.7% by weight to 10% by weight in the water-based ink.

14. The water-based ink for ink-jet recording according to claim 11, wherein the 1,2-alkanediol is straight-chain alkanediol.

15. The water-based ink for ink-jet recording according to claim 14, wherein the 1,2-alkanediol is selected from the group consisting of 1,2-butanediol, 1,2-pentanediol, 1,2-hexanediol, and a combination thereof.

16. The water-based ink for ink-jet recording according to claim 11, wherein a weight ratio (X:Y) of the alkyl glucoside (X) to the 1,2-alkanediol (Y) in the water-based ink is (X:Y)=1:1.5 to 1:40.

17. The water-based ink for ink-jet recording according to claim 11, further comprising glycerol, wherein a total amount of the 1,2-alkanediol and the glycerol in the water-based ink is 15% by weight to 35% by weight.

18. An ink cartridge containing the water-based ink for ink-jet recording as defined in claim 11.

19. An ink-jet recording apparatus comprising:
    the water-based ink for ink-jet recording as defined in claim 11;
    an ink accommodating section in which the water-based ink is accommodated; and
    an ink discharge mechanism which is configured to discharge the water-based ink accommodated in the ink accommodating section.

* * * * *